United States Patent
Stojanovski et al.

(10) Patent No.: US 10,813,075 B2
(45) Date of Patent: *Oct. 20, 2020

(54) NEXT GENERATION NODE-B (GNB) AND METHODS TO INDICATE A TYPE OF ACCESS FOR PAGING OF A USER EQUIPMENT (UE)

(71) Applicant: Apple Inc., Cupertino, CA (US)

(72) Inventors: Alexandre Saso Stojanovski, Paris (FR); Alexander Sirotkin, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,265

(22) Filed: May 9, 2019

(65) Prior Publication Data

US 2019/0335418 A1 Oct. 31, 2019

Related U.S. Application Data

(63) Continuation of application No. 16/245,089, filed on Jan. 10, 2019.

(60) Provisional application No. 62/616,955, filed on Jan. 12, 2018.

(51) Int. Cl.
| | |
|---|---|
| *H04W 68/00* | (2009.01) |
| *H04W 8/08* | (2009.01) |
| *H04W 76/28* | (2018.01) |
| *H04W 72/04* | (2009.01) |
| *H04W 80/10* | (2009.01) |
| *H04W 84/12* | (2009.01) |

(52) U.S. Cl.
CPC ........... *H04W 68/005* (2013.01); *H04W 8/08* (2013.01); *H04W 72/042* (2013.01); *H04W 76/28* (2018.02); *H04W 80/10* (2013.01); *H04W 84/12* (2013.01)

(58) Field of Classification Search
CPC . H04W 72/042; H04W 80/10; H04W 68/005; H04W 76/28; H04W 8/08; H04W 84/12
See application file for complete search history.

(56) References Cited

U.S. PATENT DOCUMENTS

| | | | | |
|---|---|---|---|---|
| 2018/0302878 A1* | 10/2018 | Byun | .................... | H04W 68/02 |
| 2019/0053120 A1* | 2/2019 | Park | ....................... | H04W 76/27 |
| 2019/0053193 A1* | 2/2019 | Park | ................... | H04W 56/0005 |

(Continued)

*Primary Examiner* — Benjamin H Elliott, IV
(74) *Attorney, Agent, or Firm* — Kowert, Hood, Munyon, Rankin & Goetzel, P.C.

(57) ABSTRACT

Embodiments of a Next Generation Node-B (gNB) and methods of communication are disclosed herein. The gNB may be configured with a gNB-CU and a gNB-DU. A first paging message for paging of the UE may be received at the gNB-CU from an access management function (AMF) entity. The first paging message may include: a paging identity of the UE; and a paging origin information element (IE) that indicates whether the paging of the UE is originated due to a protocol data unit (PDU) session from non-3GPP access. A second paging message to page the UE may be transmitted from the gNB-DU to the UE. The second paging message may include: the paging identity of the UE; and an access type parameter that indicates whether the paging of the UE is originated due to the PDU session from the non-3GPP access.

18 Claims, 8 Drawing Sheets

(56) References Cited

U.S. PATENT DOCUMENTS

2019/0166526 A1* 5/2019 Xu ..................... H04W 36/08
2019/0191409 A1* 6/2019 Stojanovski ............ H04W 8/08
2019/0335418 A1* 10/2019 Stojanovski ........ H04W 68/005

* cited by examiner

NEXT GENERATION NODE-B (GNB) AND METHODS TO INDICATE A TYPE OF ACCESS FOR PAGING OF A USER EQUIPMENT (UE)

PRIORITY CLAIM

This application is a continuation of U.S. patent application Ser. No. 16/245,089, filed Jan. 10, 2019, which claims priority under 35 USC 119(e) to U.S. Provisional Patent Application Ser. No. 62/616,955, filed Jan. 12, 2018, each of which is incorporated herein by reference in its entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, New Radio (NR) networks, and 3GPP LTE-A (LTE Advanced) networks, although the scope of the embodiments is not limited in this respect. Some embodiments relate to paging of mobile devices. Some embodiments relate to disaggregated base stations, including disaggregated Next Generation Node-B (gNB) devices.

BACKGROUND

A mobile device may communicate with a base station to exchange data. In an example scenario, the mobile device may communicate with a disaggregated base station that may include various components. For instance, those components may include a centralized control unit and a distributed unit. In some scenarios, the mobile device may communicate with multiple networks, which may be challenging. In addition, such communication may be even more challenging when a disaggregated base station is involved, in some cases. Accordingly, there is a general need for methods and systems to enable communication between the mobile device and the base station in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
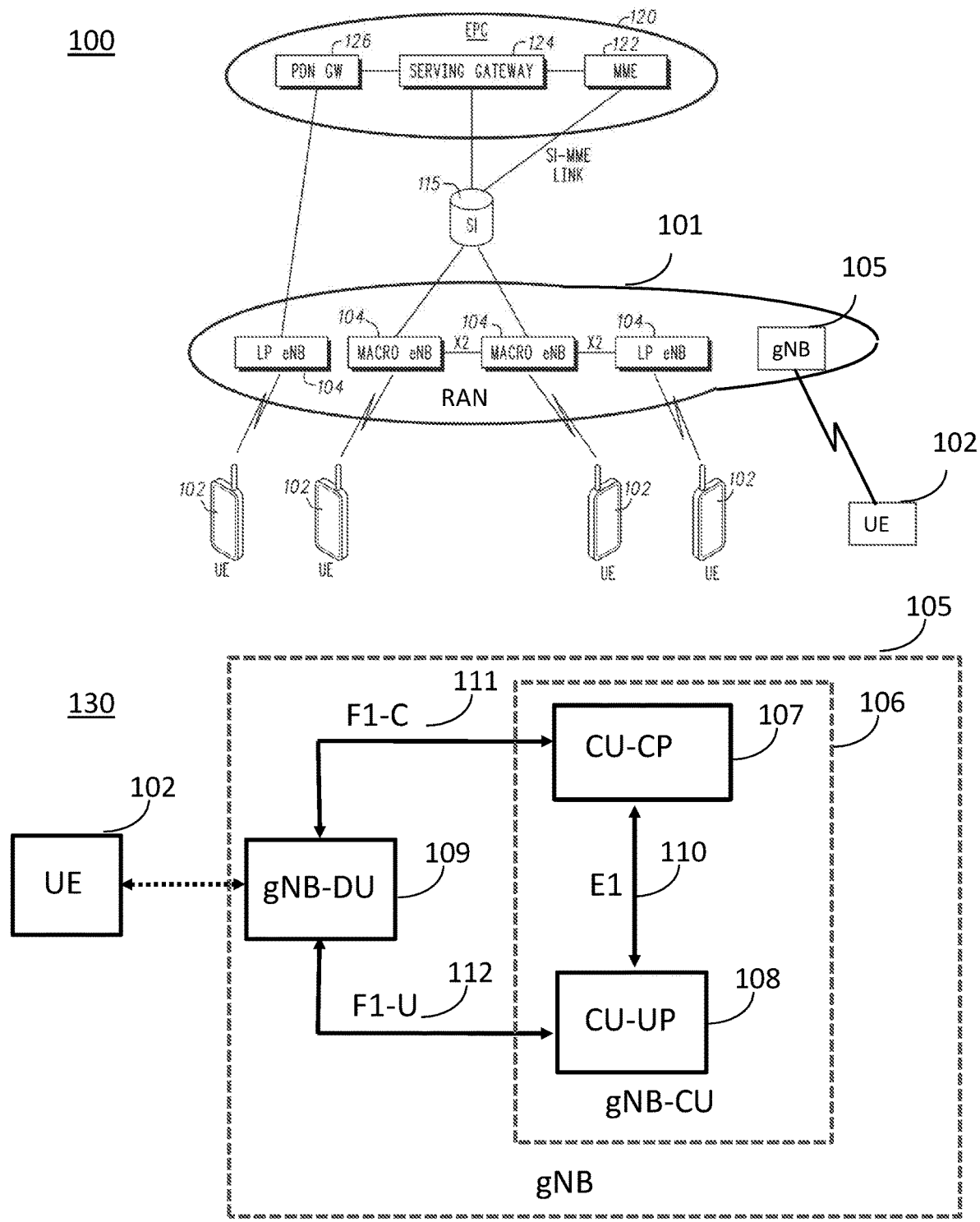
FIG. 1A is a functional diagram of an example network in accordance with some embodiments.
Figure 1B:
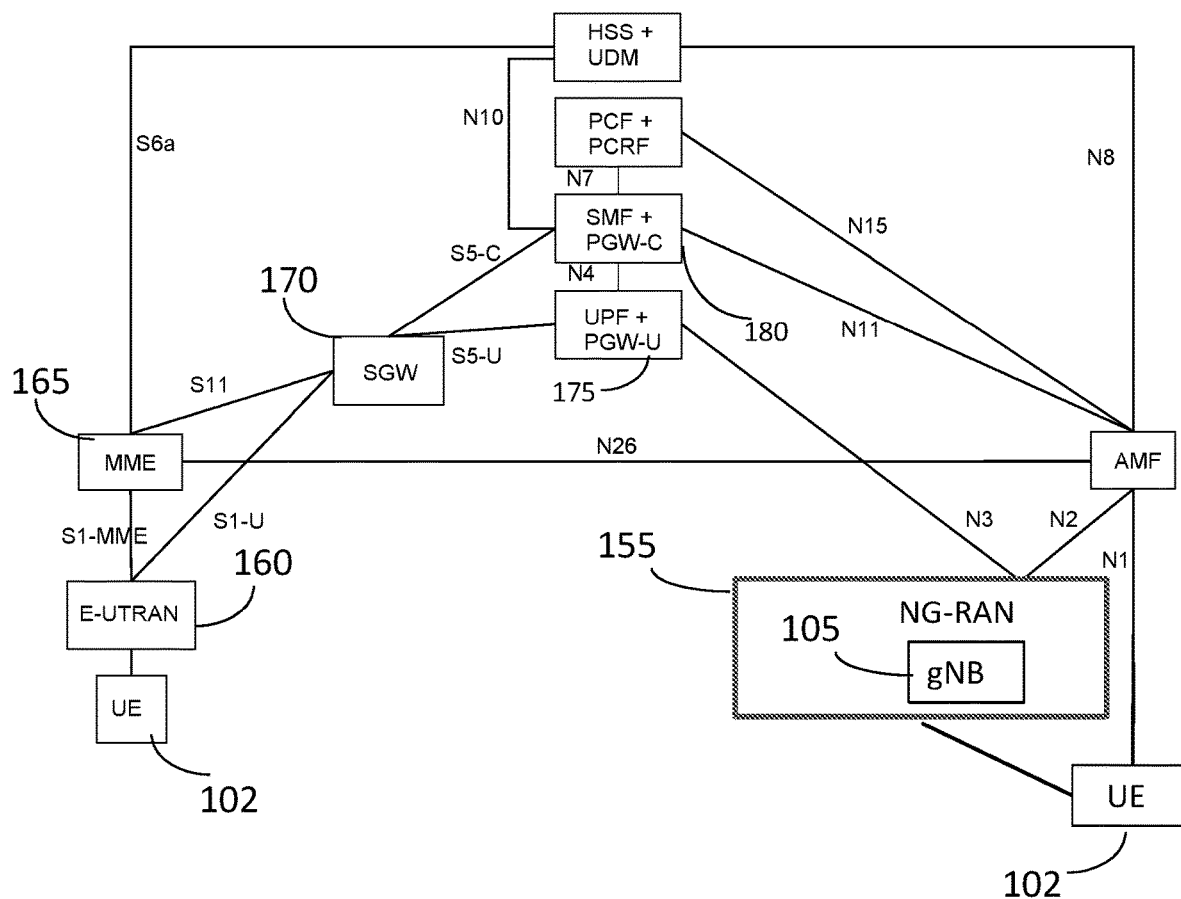
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120. In some embodiments, the core network may be a 5GC network, and one or more components may communicate through an NG interface, although the scope of embodiments is not limited in this respect. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of a 5G network. In another non-limiting example, the RAN 101 may include one or more components of an E-UTRAN and one or more components of another network (including but not limited to an NR network).

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, the gNB 105 may include multiple components. In a non-limiting example shown in 130, the gNB 105 may comprise a gNB central unit (gNB-CU) 106 and a gNB distributed unit (gNB-DU) 109. Embodiments are not limited to the number of components shown, as the gNB 105 may include multiple gNB-CUs 106 and/or multiple gNB-DUs 109, in some embodiments. In some embodiments, the gNB-CU 106 may include a control unit user-plane (CU-UP) entity 108 and a control unit control-plane (CU-CP) 107. Embodiments are not limited to the number of components shown, as the gNB-CU 106 may include multiple CU-CPs 107 and/or multiple CU-UPs 108, in some embodiments. In some embodiments, the CU-CP 107 and the CU-UP 108 may communicate over the E1 interface 110, although the scope of embodiments is not limited in this respect. In some embodiments, the gNB-CU 106 and the gNB-DU 109 may communicate over an F1 interface, although the scope of embodiments is not limited in this respect. In some embodiments, the F1 interface may include an F1-C interface 111 and an F1-U interface 112, although the scope of embodiments is not limited in this respect. In some embodiments, the CU-CP 107 and the gNB-DU 109 may communicate over the F1-C interface 111, although the scope of embodiments is not limited in this respect. In some embodiments, the CU-UP 108 and the gNB-DU 109 may communicate over the F1-U interface 112, although the scope of embodiments is not limited in this respect.

In some embodiments, the gNB-CU 106 and the gNB-DU 109 may be part of a disaggregated gNB 105. One or more of the gNB-CU 106, CU-CP 107, CU-UP 108, gNB-DU 109 may be co-located, in some embodiments. One or more of the gNB-CU 106, CU-CP 107, CU-UP 108, gNB-DU 109 may not necessarily be co-located, in some embodiments. Other arrangements are possible, including arrangements in which two or more of the gNB-CU 106, CU-CP 107, CU-UP 108, gNB-DU 109 are co-located.

The scope of embodiments is not limited to arrangements in which the gNB-CU 106 and the gNB-DU 109 are part of a disaggregated gNB 105, however. In some embodiments, one or more of the techniques, operations and/or methods described herein may be practiced by a gNB-CU 106, CU-CP 107, CU-UP 108 and/or gNB-DU 109 that may not necessarily be included in a disaggregated gNB 105.

References herein to communication between the gNB 105 and another component (such as the UE 102, MME 122, SGW 124 and/or other) are not limiting. In some embodiments, such communication may be performed between the component (such as the UE 102, MME 122, SGW 124 and/or other) and one of the gNB-CU 106, CU-CP 107, CU-UP 108, gNB-DU 109.

References herein to an operation, technique and/or method performed by the gNB 105 are not limiting. In some embodiments, such an operation, technique and/or method may be performed by one of the gNB-CU 106, CU-CP 107, CU-UP 108, gNB-DU 109.

In some embodiments, one or more of the UEs 102, gNBs 105, gNB-CU 106, CU-CP 107, CU-UP 108, gNB-DU 109, and/or eNBs 104 may be configured to operate in accordance with an NR protocol and/or NR techniques. References to a UE 102, eNB 104, gNB 105, gNB-CU 106, CU-CP 107, CU-UP 108 and/or gNB-DU 109 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below. In some embodiments, the UE 102 may transmit signals to a component of a disaggregated gNB 105 (such as the gNB-DU 109). In some embodiments, the UE 102 may receive signals from a component of a disaggregated gNB 105 (such as the gNB-DU 109).

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 175, 180 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
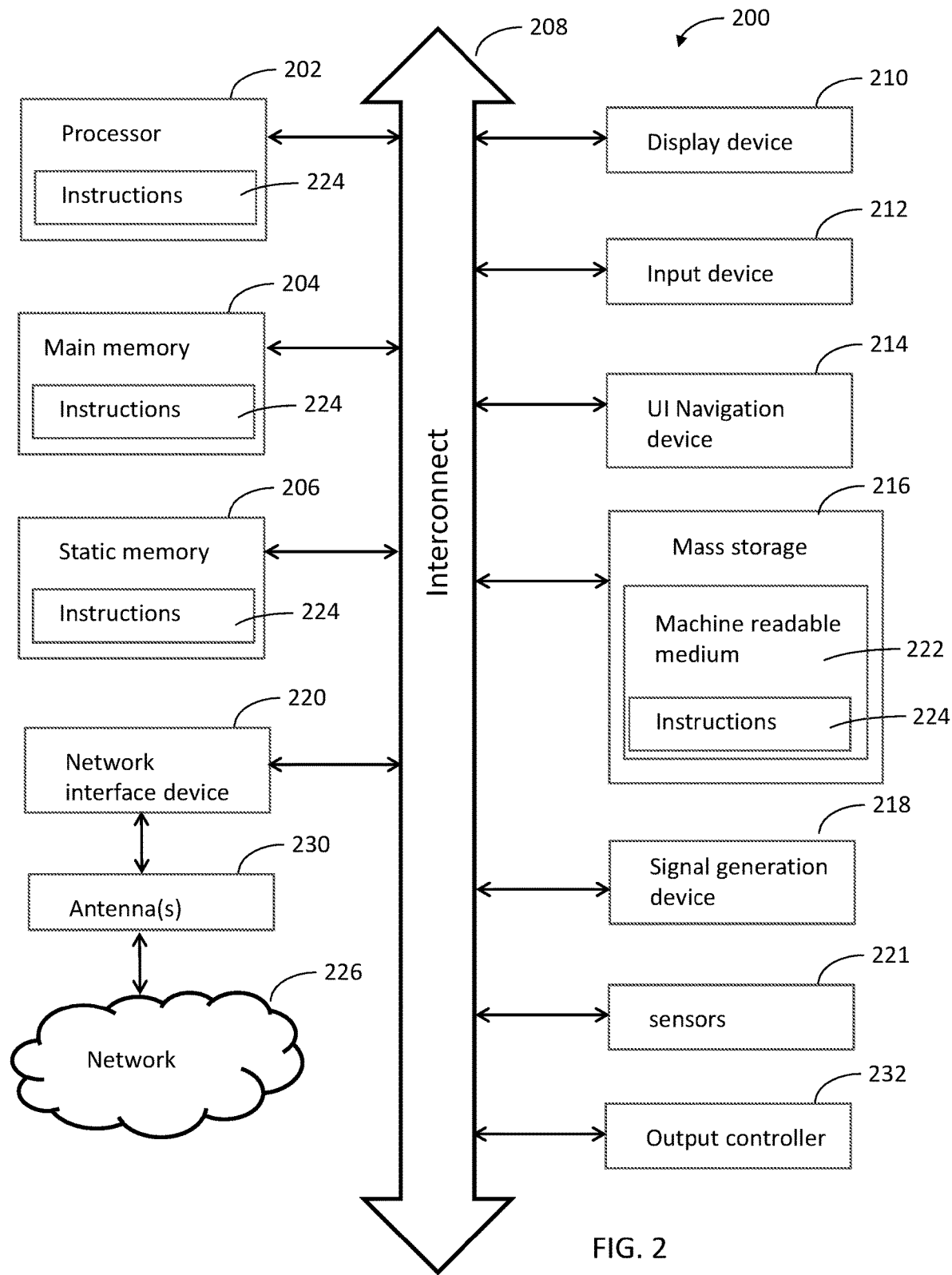
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, gNB-CU 106, CU-CP 107, CU-UP 108, gNB-DU 109, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
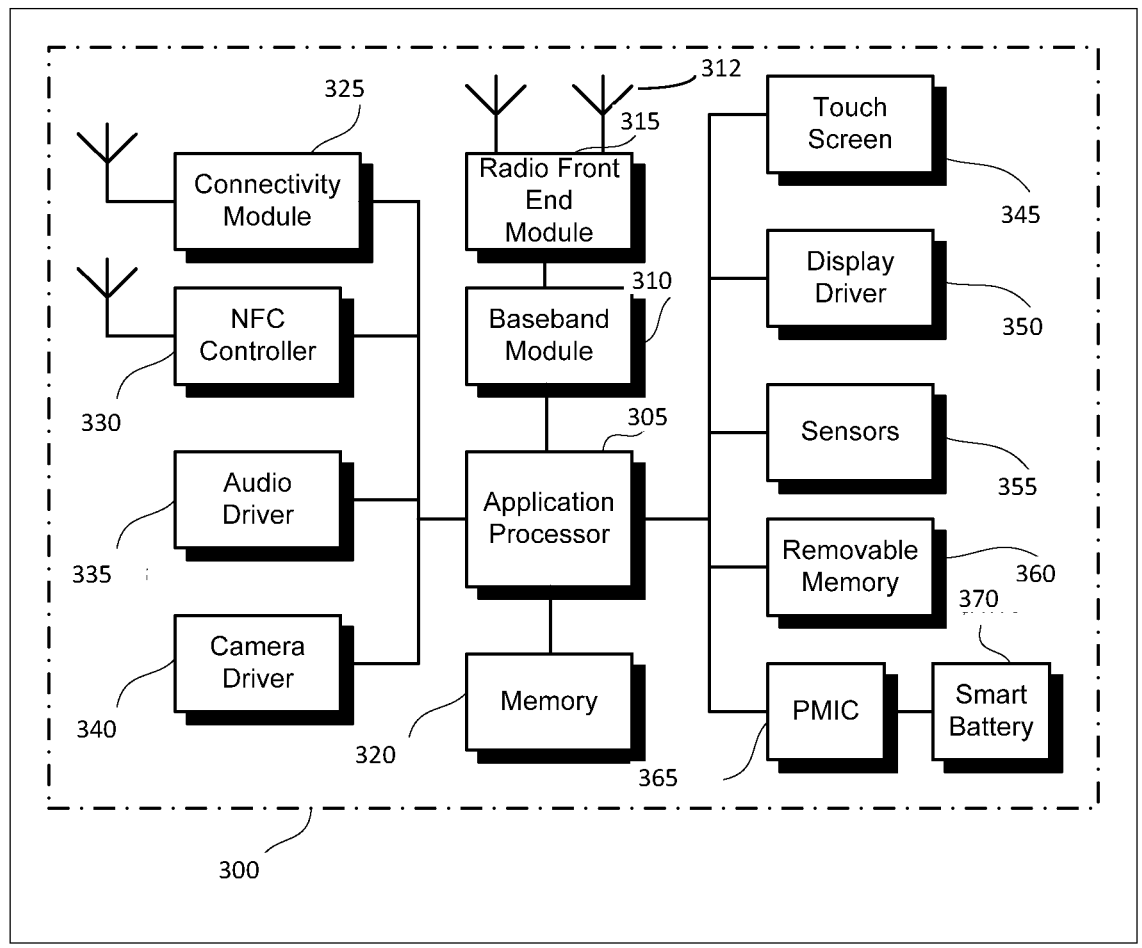
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
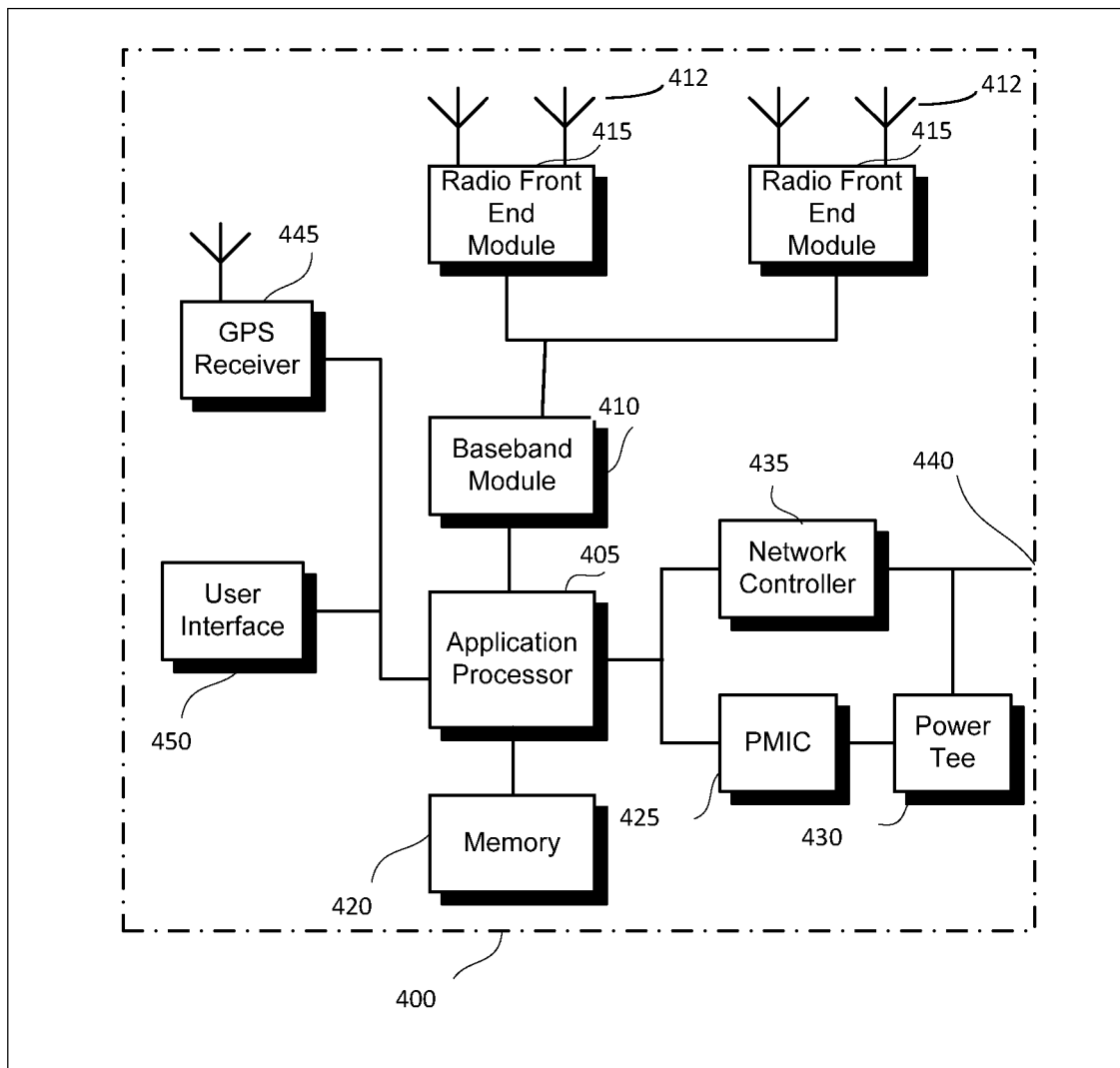
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a gNB-CU 106, an apparatus of a gNB-CU 106, a CU-CP 107, an apparatus of a CU-CP 107, a CU-CU 108, an apparatus of a CU-CU 108, a gNB-DU 109 an apparatus of a gNB-DU 109, a base station and/or an apparatus of a base station may include one or more of the components shown in one or more of FIGS. 2, 4, and 5. In some embodiments, such an eNB 104, gNB 105, gNB-CU 106, CU-CP 107, CU-UP 108, gNB-DU 109, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
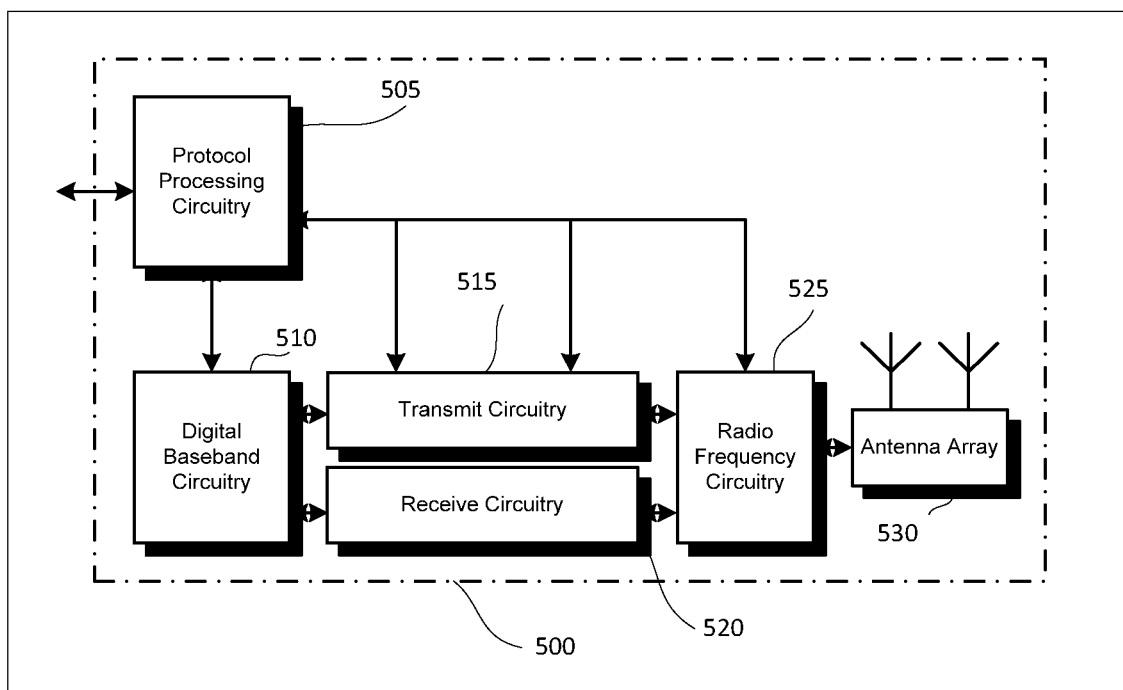
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, gNB-CU 106, CU-CP 107, CU-UP 108, gNB-DU 109, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, gNB-CU 106, CU-CP 107, CU-UP 108, gNB-DU 109, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, gNB-CU 106, CU-CP 107, CU-UP 108, gNB-DU 109, user device 300, base station 400, machine 200 and/or other device described herein may be configured to operate in accordance with 3GPP standards, although the scope of the embodiments is not limited in this respect. In some embodiments, the UE 102, eNB 104, gNB 105, gNB-CU 106, CU-CP 107, CU-UP 108, gNB-DU 109, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, gNB-CU 106, CU-CP 107, CU-UP 108, gNB-DU 109, user device 300, base station 400, machine 200 and/or other device described herein may be configured to operate according to other protocols or standards, including IEEE 802.11 or other IEEE standards. In some embodiments, the UE 102, eNB 104, gNB 105, gNB-CU 106, CU-CP 107, CU-UP 108, gNB-DU 109, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, gNB-CU 106, CU-CP 107, CU-UP 108, gNB-DU 109, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, gNB-CU 106, CU-CP 107, CU-UP 108, gNB-DU 109, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB. In addition, techniques and operations described herein that refer to the gNB-CU 106, may be applicable to an apparatus of a gNB-CU. In addition, techniques and operations described herein that refer to the CU-CP 107 may be applicable to an apparatus of a CU-CP. In addition, techniques and operations described herein that refer to the CU-UP 108 may be applicable to an apparatus of a CU-UP. In addition, techniques and operations described herein that refer to the gNB-DU 109 may be applicable to an apparatus of a gNB-DU.

It should be noted that some of the descriptions herein may refer to performance of operations, methods and/or techniques by elements such as the gNB 105, gNB-CU 106, CU-CP 107, CU-UP 108 and/or gNB-DU 109. Such references are not limiting, however. One or more of the operations, methods and/or techniques may be performed by one or more other entities, in some embodiments.

In accordance with some embodiments, a gNB 105 of a 3GPP network may include: memory; and processing circuitry. The gNB 105 may be configured with logical nodes. The logical nodes may include a gNB-CU 106 and a gNB-DU 109. The processing circuitry may decode a first paging message, wherein the first paging message is received at the gNB-CU 106 from an access management function (AMF) entity. The first paging message may be for paging of a UE 102. The first paging message may include: a paging identity of the UE 102; and a paging origin information element (IE) that indicates whether the paging of the UE 102 is originated due to a protocol data unit (PDU) session from non-3GPP access. The processing circuitry may encode, for transmission from the gNB-DU 109 to the UE 102, a second paging message to page the UE 102. The second paging message may be encoded to include: the paging identity of the UE 102; and an access type parameter that indicates whether the paging of the UE 102 is originated due to the PDU session from the non-3GPP access. These embodiments are described in more detail below.

Figure 6:
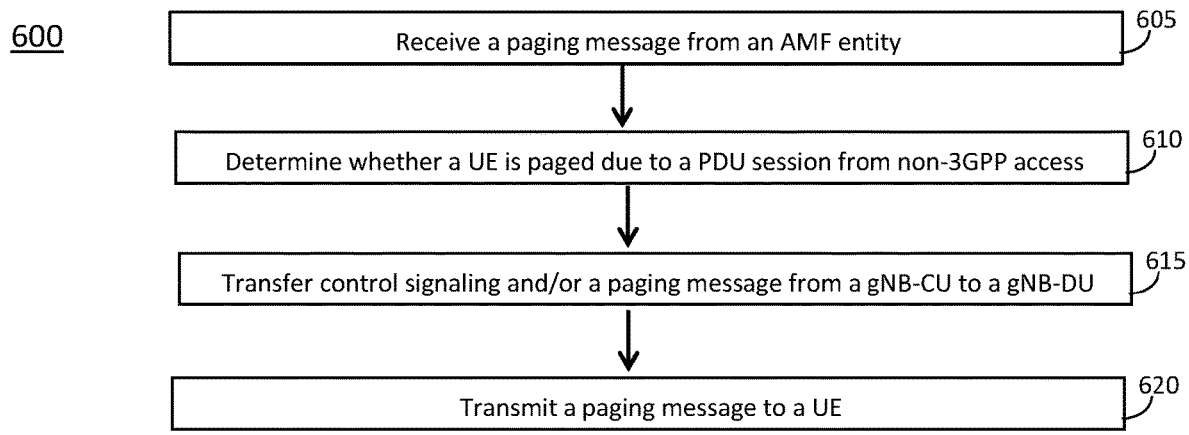
FIG. 6 illustrates the operation of a method of communication in accordance with some embodiments.

FIG. 6 illustrates the operation of a method of communication in accordance with some embodiments. It is important to note that embodiments of the method 600 may include additional or even fewer operations or processes in comparison to what is illustrated in FIG. 6. In addition, embodiments of the methods 600 are not necessarily limited to the chronological order that is shown in FIG. 6. In describing the method 600, reference may be made to one or more figures, although it is understood that the method 600 may be practiced with any other suitable systems, interfaces and components.

The method 600 and other methods described herein may refer to eNBs 104, gNBs 105, components of the gNB (such as 106-109) and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the method 600 and other methods described herein may be practiced by wireless devices configured to operate in other suitable types of wireless communication systems, including systems configured to operate according to various IEEE standards such as IEEE 802.11.

The method 600 may also be applicable to an apparatus of a gNB 105, an apparatus of an eNB 104, an apparatus of a gNB-CU 106, an apparatus of a CU-CP 107, an apparatus of a CU-UP 108, an apparatus of a gNB-DU 109 and/or an apparatus of another device described above.

It should also be noted that embodiments are not limited by references herein (such as in descriptions of the method 600 and/or other descriptions herein) to transfer, transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transfer and/or transmission. The transfer and/or transmission may be performed by an interface, a transceiver and/or other component, in some cases. In some embodiments, such an element may be decoded, detected or otherwise processed by the processing circuitry (such as by the baseband processor). The element may be received by an interface, transceiver and/or other component, in some cases. In some embodiments, the processing circuitry and the interface may be included in a same apparatus. The scope of embodiments is not limited in this respect, however, as the interface may be separate from the apparatus that comprises the processing circuitry, in some embodiments. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of those elements, and is also not limited to usage of elements that are included in standards, however. For instance, although an operation may include usage of a message in descriptions herein, it is understood that the same operation and/or similar operation may use a different message, in some embodiments.

In some embodiments, a gNB 105 may perform one or more operations of the method 600, but embodiments are not limited to performance of the method 600 and/or operations of it by the gNB 105. In some embodiments, one or more components of the gNB 105 (including but not limited to the gNB-CU 106, CU-CP 107, CU-UP 108 and/or gNB-DU 109) may perform one or more operations of the method

600. For instance, the gNB-CU 106 may perform one or more operations and the gNB-DU 109 may perform one or more operations, in some embodiments. Embodiments are not limited to performance of the method 800 by a disaggregated gNB 105 and/or components of a disaggregated gNB 105. In some embodiments, a gNB 105 that is not necessarily a disaggregated gNB 105, may perform one or more operations of the method 600.

In some embodiments, the AMF entity may perform one or more operations that may be the same as one or more operations of the method 600 or the same as one or more operations described herein. In some embodiments, the AMF entity may perform one or more operations that may be similar to one or more operations of the method 600 or similar to one or more operations described herein. In some embodiments, the AMF entity may perform one or more operations that may be reciprocal to one or more operations of the method 600 or reciprocal to one or more operations described herein. For instance, the AMF entity may transmit a paging message to the gNB 105 and/or gNB-CU 106 (such as the paging message of operation 605 and/or other).

In some embodiments, the UE 102 may perform one or more operations that may be the same as one or more operations of the method 600 or the same as one or more operations described herein. In some embodiments, the UE 102 may perform one or more operations that may be similar to one or more operations of the method 600 or similar to one or more operations described herein. In some embodiments, the UE 102 may perform one or more operations that may be reciprocal to one or more operations of the method 600 or reciprocal to one or more operations described herein. For instance, the UE 102 may receive a paging message from the gNB 105 and/or gNB-DU 109 (such as the paging message of operation 620 and/or other).

In some embodiments, the gNB 105 may be configured with one or more logical nodes, including a gNB-CU 106 and a gNB-DU 109. In some embodiments, the gNB 105 may be configured with one or more logical nodes, including one or more gNB-CUs 106 and/or one or more gNB-DUs 109.

At operation 605, the gNB 105 and/or a component of the gNB 105 may receive a paging message from an access management function (AMF) entity. This paging message may be referred to in descriptions herein as a "first paging message" for clarity, but such references are not limiting. In some embodiments, the first paging message may be received at the gNB-CU 106 from the AMF entity. In some embodiments, the first paging message may be received from the AMF entity on a next generation (NG) interface.

In some embodiments, the first paging message may be for paging of a UE 102. In some embodiments, the UE 102 may be configured for 3GPP access and for non-3GPP access, although the scope of embodiments is not limited in this respect.

In some embodiments, the first paging message may include one or more of: a paging identity of the UE 102, and a paging origin information element (IE) and/or other element(s). In some embodiments, the paging origin IE may indicate whether the paging of the UE 102 is originated due to a protocol data unit (PDU) session from non-3GPP access. In some embodiments, the paging origin IE may indicate whether the paging of the UE 102 is originated due to the PDU session from non-3GPP access or due to a PDU session from 3GPP access.

It should be noted that descriptions herein may refer to elements such as "a PDU session from non-3GPP access," but such references are not limiting. In some embodiments, the PDU session may be a PDU session that belongs to the non-3GPP access. In some embodiments, the PDU session may be a PDU session that is associated with the non-3GPP access. In some embodiments, the PDU session may be a "non-3GPP PDU session." One or more of the operations, techniques, methods and/or concepts may be based on one or more of the above PDU sessions. For instance, in one or more operations described herein, the paging origin IE, access type parameter and/or other element may indicate whether the paging of the UE 102 is originated due to a PDU session that belongs to the non-3GPP access. In one or more operations described herein, the paging origin IE, access type parameter and/or other element may indicate whether the paging of the UE 102 is originated due to a PDU session that is associated with the non-3GPP access. In one or more operations described herein, the paging origin IE, access type parameter and/or other element may indicate whether the paging of the UE 102 is originated due to a non-3GPP PDU session. Other operations may be extended/modified in a similar manner. In addition, the above discussion regarding the non-3GPP access may be applicable to PDU sessions from 3GPP access.

An example call flow is described below. Some embodiments may include one or more of the following elements. Some embodiments may include one or more additional elements. Some embodiments may not necessarily include all elements described below. Some embodiments may include one or more similar elements. Some embodiments may include one or more alternate elements.

In the example call flow, the UE 102 may be in an idle mode. A PDU (such as a downlink PDU, a PDU for the UE 102, a PDU intended for the UE 102 and/or other PDU) may arrive at one or more components of the core network. For instance, the PDU may arrive from the Internet, although the scope of embodiments is not limited in this respect. Since the UE 102 is idle (that is, not connected), the PDU cannot (in some cases) be delivered immediately to the UE 102 and may be buffered in the one or more components of the core network. The one or more components of the core network may page the UE 102 to cause the UE 102 to enter a connected more. The one or more components of the core network may decide to deliver the buffered PDU via 3GPP access or non-3GPP access, and may indicate so in a paging message using the paging origin IE. The UE 102 may connect and/or establish a PDU session via 3GPP access or non-3GPP access, and the PDU may be delivered to the UE 102.

In some embodiments, the non-3GPP access may include access to a wireless local area network (WLAN). Embodiments are not limited to access to a WLAN, however, as the non-3GPP access may include access to any suitable type of network.

In some embodiments, the first paging message may include one or more of: a tracking area identifier (TAI) list; a UE identity index value; a paging priority for paging of the UE 102; a paging discontinuous reception (DRX) parameter; a UE radio capability for paging IE that includes paging specific UE radio capability information; an assistance data for paging IE that includes assistance information for paging optimization and/or other element(s).

In some embodiments, the AMF entity may perform network management functionality for the gNB 105, although the scope of embodiments is not limited in this respect.

At operation 610, the gNB 105 and/or a component of the gNB 105 may determine whether the UE 102 is paged due to a PDU session from non-3GPP access. In some embodiments, the gNB 105 and/or a component of the gNB 105 may determine whether the UE 102 is paged due to a PDU session from non-3GPP access or due to a PDU session from 3GPP access.

In some embodiments, the gNB 105 and/or a component of the gNB 105 may determine that the paging of the UE 102 is originated due to the PDU session from the non-3GPP access if the first paging message includes the paging origin IE. In some embodiments, the gNB 105 and/or a component of the gNB 105 may determine that the paging of the UE 102 is originated due to a PDU session from 3GPP access if the first paging message does not include the paging origin IE.

In some embodiments, the gNB 105 and/or a component of the gNB 105 may encode, for transmission from the gNB-DU 109 to the UE 102, one or more PDUs received at the gNB-CU 106 from a user plane function (UPF) entity for forwarding to the UE 102 as part of 3GPP access. In some embodiments, the gNB 105 and/or a component of the gNB 105 may, if the first paging message does not include the paging origin IE: encode, for transmission from the gNB-DU 109 to the UE 102, one or more PDUs received at the gNB-CU 106 from a UPF entity for forwarding to the UE 102 as part of 3GPP access.

At operation 615, the gNB 105 and/or a component of the gNB 105 may transfer control signaling and/or a paging message. This paging message may be referred to in descriptions herein as a "third paging message" for clarity, but such references are not limiting. In some embodiments, the control signaling and/or third paging message may be transferred from the gNB-CU 106 to the gNB-DU 109. In some embodiments, the gNB 105 and/or a component of the gNB 105 may encode, for transfer from the gNB-CU 106 to the gNB-DU 109 over an F1 interface, the third paging message and/or control signaling to indicate that the gNB-DU 109 is to page the UE 102.

In some embodiments, the gNB 105 and/or a component of the gNB 105 may encode the control signaling and/or third paging message and/or control signaling to include the access type parameter. In some embodiments, the access type parameter may indicate whether the paging of the UE 102 is originated due to the PDU session from the non-3GPP access. In some embodiments, the access type parameter may indicate whether the paging of the UE 102 is originated due to the PDU session from the non-3GPP access or due to a PDU session from 3GPP access.

In some embodiments, the gNB 105 and/or a component of the gNB 105 may encode the control signaling and/or third paging message to include the access type parameter if the paging of the UE 102 is originated due to the PDU session from the non-3GPP access. In some embodiments, the gNB 105 and/or a component of the gNB 105 may encode the control signaling and/or third paging message to exclude the access type parameter if the paging of the UE 102 is originated due to a PDU session from 3GPP access.

At operation 620, the gNB 105 and/or a component of the gNB 105 may transmit a paging message to the UE 102. This paging message may be referred to in descriptions herein as a "second paging message" for clarity, but such references are not limiting.

In some embodiments, the gNB 105 and/or a component of the gNB 105 may encode, for transmission from the gNB-DU 109 to the UE 102, a second paging message to page the UE 102. In some embodiments, the second paging message may be encoded to include one or more of: the paging identity of the UE 102, an access type parameter and/or other element(s). In some embodiments, the access type parameter may indicate whether the paging of the UE 102 is originated due to the PDU session from the non-3GPP access. In some embodiments, the access type parameter may indicate whether the paging of the UE 102 is originated due to the PDU session from the non-3GPP access or due to a PDU session from 3GPP access.

In some embodiments, the gNB 105 and/or a component of the gNB 105 may encode the second paging message to include the access type parameter if the paging of the UE 102 is originated due to the PDU session from the non-3GPP access. In some embodiments, the gNB 105 and/or a component of the gNB 105 may encode the second paging message to exclude the access type parameter if the paging of the UE 102 is originated due to a PDU session from 3GPP access.

In some embodiments, the gNB 105 and/or a component of the gNB 105 may encode the second paging message to include a paging cell list IE that indicates one or more cells, wherein the UE 102 is to be paged if the UE 102 operates in one of the cells indicated by the paging cell list IE.

In some embodiments, the gNB 105 and/or a component of the gNB 105 may encode the second paging message for transmission on a physical downlink control channel (PDCCH).

In some embodiments, the gNB 105 and/or a component of the gNB 105 may encode the second paging message to page the UE 102 if the 3GPP access is for a cell of a tracking area that corresponds to a TAI on the TAI list (of the first paging message).

In some embodiments, the gNB 105 and/or a component of the gNB 105 may determine, based at least partly on the UE identity index value (of the first paging message), a paging frame for transmission of the second paging message.

In some embodiments, an apparatus of a gNB 105 and/or a component of the gNB 105 may comprise memory. The memory may be configurable to store at least a portion of a paging message. The memory may store one or more other elements and the apparatus may use them for performance of one or more operations. The apparatus may include processing circuitry, which may perform one or more operations (including but not limited to operation(s) of the method 600 and/or other methods described herein). The processing circuitry may include a baseband processor. The baseband circuitry and/or the processing circuitry may perform one or more operations described herein, including but not limited to encoding of the paging message. The apparatus may include a transceiver to transmit the paging message. The transceiver may transmit and/or receive other blocks, messages and/or other elements.

In should be noted that references herein to an NG-RAN node are not limiting. In addition, references herein to a gNB 105 are not limiting. In some embodiments, a technique, operation, method and/or concept may be described herein in terms of one of those components (of the NG-RAN node and gNB 105), but it is understood that the same (and/or similar) technique, operation, method and/or concept may be applicable to embodiments in which the other component (of the NG-RAN node and gNB 105) is used. In a non-limiting example, an operation performed by a gNB 105 in descriptions herein may be performed by the NG-RAN node, in some embodiments. In another non-limiting example, an operation performed by an NG-RAN node in descriptions herein may be performed by the gNB 105, in some embodiments.

NG-AP is a protocol between NG-RAN and 5GC which may be used to support the SA 5G deployment. In some embodiments, stage-3 level messaging and procedures for NG-AP Paging may be used. In some embodiments, a paging procedure in NR/5GC may be somewhat different than a paging procedure of LTE/EPC, in that it may include one or more of the following elements (and/or similar elements) not previously signaled in LTE/EPC: access associated to the PDU session; PDU Session ID; and/or other. In some embodiments, such information may be used to page a UE 102 that supports multiple PDU sessions in 3GPP and non-3GPP accesses via 3GPP access for activation of UP connectivity on non-3GPP access. This is something that also may be supported by the NG-AP paging procedure. In some embodiments, the NG-AP paging procedure may include support for non-3GPP access. In some embodiments, stage-3 signaling for the paging procedure for NG-AP and F1-AP protocols may be used, including support for non-3GPP access paging.

In some embodiments, an NG-AP paging message and procedure at stage-3 level may be used. In some embodiments, one or more parameters in the paging message may be similar to LTE with an exception of functionality related to the non-3GPP access, although the scope of embodiments is not limited in this respect. In some embodiments, support may be included for paging a UE 102 via 3GPP access in the case in which multiple PDU sessions for the UE 102 are established via 3GPP and non-3GPP access. In such cases, the 5G network may be able to page the UE 102 via a 3GPP access (which may support the paging mechanism) to establish connectivity via non-3GPP access (such as WLAN, 802.11, Wi-Fi and/or others), which may not necessarily have paging capability.

In some embodiments, a paging message may include one or more parameters that may be similar to one or more parameters of a paging message of LTE. Such parameters may include, but are not limited to: UE Identity Index value, UE Paging Identity, Paging DRX, List of TAIs, Paging Priority, UE Radio Capability for Paging, Assistance Data for Paging and/or others. In some embodiments, a paging message may include one or more parameters that are not included in a paging message of LTE. Such parameters may include, but are not limited to: access type (3GPP or non-3GPP); PDU session id; and/or others.

In some embodiments, with such a message, the network may activate individual PDU sessions on specific access (3GPP or non-3GPP) via NG-RAN. In some embodiments, one or more of the following may be used: a transparent container; IEs in NG-AP, F1-AP and/or RRC protocols; and/or other. In some embodiments, the paging procedure may enable the AMF to page a UE 102 in the specific NG-RAN node.

Figure 7:
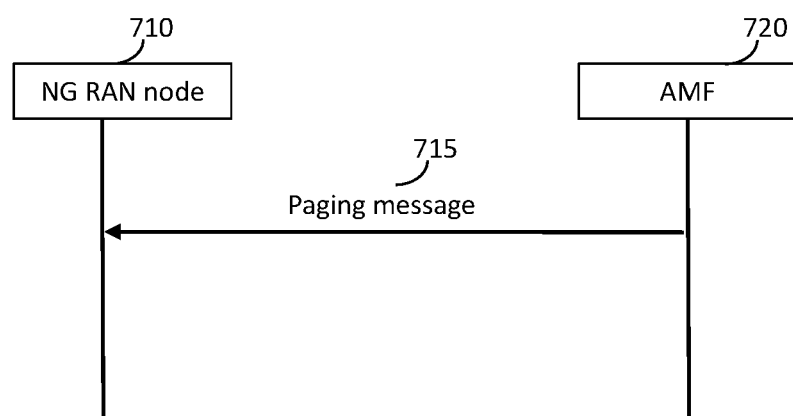
FIG. 7 illustrates an example message that may be exchanged in accordance with some embodiments.

FIG. 7 illustrates an example message that may be exchanged in accordance with some embodiments. In the non-limiting example 700 in FIG. 7, the AMF 720 may send a paging message 715 to the NG-RAN node/gNB 710.

In some embodiments, one or more of the following may be applicable. The AMF may initiate the paging procedure by sending the PAGING message to the NG-RAN node. After reception of the PAGING message, the NG-RAN node shall perform paging of the UE 102 in cells which belong to tracking areas as indicated in the List of TAIs IE. The Paging DRX IE may be included in the PAGING message, and if present, the NG-RAN node shall use it according to one or more 3GPP standards (including but not limited to TS 38.304). For each cell that belongs to any of the TAs indicated in the List of TAIs IE, the NG-RAN shall generate one page on the radio interface. The Paging Priority IE may be included in the PAGING message, and if present, the NG-RAN node may use it according to one or more 3GPP standards (including but not limited to TS 23.502). If the UE Radio Capability for Paging IE is included in the PAGING message, the NG-RAN node may use it to apply specific paging schemes. If the Assistance Data for Recommended Cells IE is included in the Assistance Data for Paging IE it may be used, together with the Paging Attempt Information IE if also present, according to one or more 3GPP standards (including but not limited to TS 38.300). If the NAS Container IE is included in the PAGING message, the NG-RAN node shall pass it transparently to the UE. In some embodiments, one or more of the above may be applicable and one or more of the above may not necessarily be applicable.

In descriptions herein, one or more of the above may be considered mandatory (via usage of the word "shall"), but such references are not limiting. In some embodiments, one or more of the above may be mandatory. In some embodiments, one or more of the above may be optional. In some embodiments, one or more of the above may be mandatory and one or more of the above may be optional.

In some embodiments, a paging message 715 may be sent by the AMF 720 and may be used to page a UE 102 in one or several tracking areas. In some embodiments, the paging message 715 may be sent from the AMF 720 to the NG-RAN node 710. In some embodiments, the paging message 715 may be sent from the AMF 720 to the gNB 105. In some embodiments, the paging message 715 may be sent from the AMF 720 to the gNB-CU 106.

A non-limiting example of a paging message is shown in the table below. The table below indicates one or more information elements (IEs) that may be included in a paging message, in some embodiments. The paging message may not necessarily include all IEs/parameters shown, in some embodiments. The paging message may include one or more additional IEs/parameters not shown, in some embodiments.

| IE/Group Name | Presence | Range | IE type and reference | Criticality | Assigned Criticality |
|---|---|---|---|---|---|
| Message Type | M | | 9.3.1.1 | YES | ignore |
| UE Identity Index value | M | | <ref> | YES | ignore |
| UE Paging Identity | M | | <ref> | YES | ignore |
| Paging DRX | O | | <ref> | YES | ignore |
| List of TAIs | | 1 | | YES | ignore |
| >TAI List Item | | 1 ... <maxnoofTAIs> | | EACH | ignore |
| >>TAI | M | | <ref> | — | |
| Paging Priority | O | | <ref> | YES | ignore |
| UE Radio Capability for Paging | O | | <ref> | YES | ignore |
| Assistance Data for Paging | O | | <ref> | YES | ignore |
| NAS Container | O | | <ref> | YES | ignore |

Another non-limiting example of a paging message is shown in the table below. The table below indicates one or more information elements (IEs) that may be included in a paging message, in some embodiments. The paging message may not necessarily include all IEs/parameters shown, in some embodiments. The paging message may include one or more additional IEs/parameters not shown, in some embodiments.

| IE/Group Name | Presence | Range | IE type and reference | Criticality | Assigned Criticality |
|---|---|---|---|---|---|
| Message Type | M | | 9.3.1.1 | YES | ignore |
| UE Identity Index value | M | | <ref> | YES | ignore |
| UE Paging Identity | M | | <ref> | YES | ignore |
| Paging DRX | O | | <ref> | YES | ignore |
| List of TAIs | | 1 | | YES | ignore |
| >TAI List Item | | 1 . . . <maxnoofTAIs> | | EACH | ignore |
| >>TAI | M | | <ref> | — | |
| Paging Priority | O | | <ref> | YES | ignore |
| UE Radio Capability for Paging | O | | <ref> | YES | ignore |
| Assistance Data for Paging | O | | <ref> | YES | ignore |
| Access Type | O | | <ref> | YES | ignore |
| PDU Session ID | O | | <ref> | YES | ignore |

In some embodiments, a paging message may be sent from the gNB-CU 106 to the gNB-DU 109. In some embodiments, the paging message may be sent by the gNB-CU 106 and may be used to request the gNB-DU 109 to page UEs 102. A non-limiting example of a paging message is shown in the table below. The table below indicates one or more information elements (IEs) that may be included in a paging message, in some embodiments. The paging message may not necessarily include all IEs/parameters shown, in some embodiments. The paging message may include one or more additional IEs/parameters not shown, in some embodiments.

| IE/Group Name | Presence | Range | IE type and reference | Criticality | Assigned Criticality |
|---|---|---|---|---|---|
| Message Type | M | | 9.3.1.1 | YES | reject |
| UE Identity Index value | M | | FFS | YES | reject |
| UE Paging identity | M | | FFS | YES | reject |
| Paging DRX | O | | FFS | YES | ignore |
| Paging Priority | O | | FFS | YES | ignore |
| Paging Cell List | | 1 | | | |
| >Paging Cell Item IEs | | 1 . . . <maxnoofPagingCells> | | EACH | ignore |
| >>Cell-ID | M | | FFS | — | |
| NAS Container | O | | <ref> | YES | ignore |

Another non-limiting example of a paging message is shown in the table below. The table below indicates one or more information elements (IEs) that may be included in a paging message, in some embodiments. The paging message may not necessarily include all IEs/parameters shown, in some embodiments. The paging message may include one or more additional IEs/parameters not shown, in some embodiments.

| IE/Group Name | Presence | Range | IE type and reference | Criticality | Assigned Criticality |
|---|---|---|---|---|---|
| Message Type | M | | 9.3.1.1 | YES | reject |
| UE Identity Index value | M | | FFS | YES | reject |
| UE Paging identity | M | | FFS | YES | reject |
| Paging DRX | O | | FFS | YES | ignore |
| Paging Priority | O | | FFS | YES | ignore |
| Paging Cell List | | 1 | | | |
| >Paging Cell Item IEs | | 1 . . . <maxnoofPagingCells> | | EACH | ignore |
| >>Cell-ID | M | | FFS | — | |
| Access Type | O | | <ref> | YES | ignore |
| PDU Session ID | O | | <ref> | YES | ignore |

In some embodiments, a gNB 105 and/or NG-RAN node may be configured to receive a paging message via the NG interface. The gNB 105 and/or NG-RAN node may be further configured to send a paging message to the UE 102. The paging message may include NAS level information pertaining to an access type to be used by the UE 102 for connectivity. In some embodiments, the access type may be 3GPP access and/or non-3GPP access, although the scope of embodiments is not limited in this respect.

In some embodiments, the gNB 105 and/or NG-RAN node may comprise a gNB-CU 106 and a gNB-DU 109, interconnected by the F1 interface. The gNB-CU 106 may be configured to transfer the said paging message received by the gNB-CU 106 to the gNB-DU 109 via the F1 interface. In some embodiments, the paging message may include the access type (indicating 3GPP or non-3GPP access). In some embodiments, the paging message may include a PDU session id, indication a PDU session to be activated by the UE 102 via the indicated access.

In Example 1, a Next Generation Node-B (gNB) of a Third Generation Partnership Project (3GPP) network may be configured with logical nodes including a gNB central unit (gNB-CU) and a gNB distributed unit (gNB-DU). An apparatus of the gNB may comprise memory. The apparatus may further comprise processing circuitry. The processing circuitry may be configured to decode a first paging message received at the gNB-CU from an access management function (AMF) entity. The first paging message may be for paging of a User Equipment (UE). The first paging message may include: a paging identity of the UE, and a paging origin information element (IE) that indicates whether the paging of the UE is originated due to a protocol data unit (PDU) session from non-3GPP access. The processing circuitry may be further configured to encode, for transmission from the gNB-DU to the UE, a second paging message to page the UE, the second paging message encoded to include: the paging identity of the UE, and an access type parameter that indicates whether the paging of the UE is originated due to the PDU session from the non-3GPP access.

In Example 2, the subject matter of Example 1, wherein the processing circuitry may be further configured to encode, for transfer from the gNB-CU to the gNB-DU over an F1 interface, control signaling to indicate that the gNB-DU is to page the UE. The processing circuitry may be further configured to encode the control signaling to include the access type parameter.

In Example 3, the subject matter of one or any combination of Examples 1-2, wherein the processing circuitry may be further configured to encode the second paging message to include the access type parameter if the paging of the UE is originated due to the PDU session from the non-3GPP access. The processing circuitry may be further configured to encode the second paging message to exclude the access type parameter if the paging of the UE is originated due to a PDU session from 3GPP access.

In Example 4, the subject matter of one or any combination of Examples 1-3, wherein the processing circuitry may be further configured to determine that the paging of the UE is originated due to the PDU session from the non-3GPP access if the first paging message includes the paging origin IE. The processing circuitry may be further configured to determine that the paging of the UE is originated due to a PDU session from 3GPP access if the first paging message does not include the paging origin IE.

In Example 5, the subject matter of one or any combination of Examples 1-4, wherein the first paging message may further include a tracking area identifier (TAI) list. The processing circuitry may be further configured to encode the second paging message to page the UE if the 3GPP access is for a cell of a tracking area that corresponds to a TAI on the TAI list.

In Example 6, the subject matter of one or any combination of Examples 1-5, wherein the first paging message may further include a UE identity index value. The processing circuitry may be further configured to determine, based at least partly on the UE identity index value, a paging frame for transmission of the second paging message.

In Example 7, the subject matter of one or any combination of Examples 1-6, wherein the first paging message may further include one or more of: a paging priority for paging of the UE, and a paging discontinuous reception (DRX) parameter.

In Example 8, the subject matter of one or any combination of Examples 1-7, wherein the first paging message may further include one or more of: a UE radio capability for paging IE that includes paging specific UE radio capability information, and an assistance data for paging IE that includes assistance information for paging optimization.

In Example 9, the subject matter of one or any combination of Examples 1-8, wherein the processing circuitry may be further configured to encode the second paging message to include a paging cell list IE that indicates one or more cells, wherein the UE is to be paged if the UE operates in one of the cells indicated by the paging cell list IE.

In Example 10, the subject matter of one or any combination of Examples 1-9, wherein the processing circuitry may be further configured to encode the second paging message for transmission on a physical downlink control channel (PDCCH).

In Example 11, the subject matter of one or any combination of Examples 1-10, wherein the first paging message may be received from the AMF entity on a next generation (NG) interface.

In Example 12, the subject matter of one or any combination of Examples 1-11, wherein the non-3GPP access may include access to a wireless local area network (WLAN).

In Example 13, the subject matter of one or any combination of Examples 1-12, wherein the apparatus may include a transceiver to transmit the second paging message. The processing circuitry may include a baseband processor to encode the second paging message. The memory may be configured to store at least a portion of the second paging message.

In Example 14, a non-transitory computer-readable storage medium may store instructions for execution by processing circuitry of a Next Generation Node-B (gNB) of a Third Generation Partnership Project (3GPP) network. The gNB may be configured with logical nodes including a gNB central unit (gNB-CU) and a gNB distributed unit (gNB-DU). The operations may configure the processing circuitry to decode a first paging message received at the gNB-CU from an access management function (AMF) entity. The first paging message may include a paging origin information element (IE) that indicates whether paging of a User Equipment (UE) is originated due to a protocol data unit (PDU) session from non-3GPP access. The operations may further configure the processing circuitry to encode, for transfer from the gNB-CU to the gNB-DU, control signaling that indicates: that the gNB-DU is to page the UE, and whether paging of the UE is originated due to the PDU session from the non-3GPP access. The operations may further configure the processing circuitry to encode a second paging message for transmission by the gNB-DU to the UE. The second paging message may be encoded to include an access type parameter that indicates whether paging of the UE is originated due to the PDU session from the non-3GPP access.

In Example 15, the subject matter of Example 14, wherein the first paging message may be received on a next generation (NG) interface between the gNB-CU and the AMF entity. The operations may further configure the processing circuitry to encode the control signaling for transfer from the gNB-CU to the gNB-DU on an F1 interface.

In Example 16, the subject matter of one or any combination of Examples 14-15, wherein the first paging message may further include one or more of: a tracking area identifier (TAI) list, a UE identity index value, a paging priority for paging of the UE, a paging discontinuous reception (DRX) parameter, a UE radio capability for paging IE, and an assistance data for paging IE.

In Example 17, the subject matter of one or any combination of Examples 14-16, wherein the first paging message may include a paging identity of the UE. The operations may further configure the processing circuitry to encode the second paging message to include the paging identity of the UE.

In Example 18, the subject matter of one or any combination of Examples 14-17, wherein the operations may further configure the processing circuitry to, if the first paging message does not include the paging origin IE: encode, for transmission from the gNB-DU to the UE, one or more protocol data units (PDUs) received at the gNB-CU from a user plane function (UPF) entity for forwarding to the UE as part of 3GPP access.

In Example 19, an apparatus of a Next Generation Node-B (gNB) of a Third Generation Partnership Project (3GPP) network may comprise memory. The apparatus may further comprise processing circuitry. The processing circuitry may be configured to decode a first paging message for paging of a User Equipment (UE). The first paging message may be received from an access management function (AMF) entity that performs network management functionality for the gNB. The first paging message may include a paging origin information element (IE) that indicates whether the paging of the UE is originated due to a protocol data unit (PDU) session from non-3GPP access. The processing circuitry may be further configured to encode, for transmission to the UE, a second paging message to page the UE. The second paging message may be encoded to include an access type parameter that indicates whether the paging of the UE is originated due to the PDU session from the non-3GPP access.

In Example 20, the subject matter of Example 19, wherein the processing circuitry may be further configured to, if the first paging message does not include the paging origin IE: encode, for transmission to the UE, one or more protocol data units (PDUs) received from a user plane function (UPF) entity for forwarding to the UE as part of the 3GPP access.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a base station configured for operation in a Third Generation Partnership Project (3GPP) access network, the apparatus comprising:
    memory; and a processor, configured to:
        decode a first paging message received at the base station from an access management function (AMF) entity to initiate paging of a User Equipment (UE), wherein the processor is configured to decode the first paging message to determine:
            a UE paging identity information element (IE) that identifies the UE; and
            a tracking area identifier (TAI) list that identifies tracking areas;
        wherein the is further configured to decode the first paging message to determine if a paging origin IE is included in the first paging message, the paging origin IE indicating whether the paging of the UE is originated due to a protocol data unit (PDU) session from a non-3GPP access network;
        wherein in response to decoding the first paging message, the processor is configured to encode a second paging message to page the UE, the second paging message for transmission within a tracking area on the TAI list,
        wherein the second paging message encoded to include:
            the paging identity of the UE, and
            an access type parameter if the paging of the UE originated due to a PDU session from a non-3GPP access network.

2. The apparatus of claim 1, wherein the base station is configured with logical nodes including a central unit (CU) and a distributed unit (DU).

3. The apparatus of claim 2, wherein the processor is configured to transfer control signalling from the CU to the DU for the second paging message.

4. The apparatus of claim 2, wherein the processor is configured to transfer control signalling from the CU to the DU for the second paging message.

5. The apparatus of claim 1, wherein the processor is further configured to decode the first paging message to determine if a paging discontinuous reception (DRX) IE is included in the first paging message.

6. The apparatus of claim 5, wherein the processor is configured to cause the base station to transmit the second paging message to the UE within a paging occasion based on information in the DRX IE if the paging DRX IE is included in the first paging message.

7. The apparatus of claim 1 wherein if the paging origin IE is included in the first paging message, and if the paging origin IE indicates that the paging of the UE is originated due to a PDU from a non-3GPP access network, the processor is configured to include the access type parameter in the second paging message to indicate to the UE that the paging originated from the non-3GPP access network.

8. The apparatus of claim 7 wherein the non-3GPP access network comprises a wireless local area network (WLAN).

9. The apparatus of claim 1 wherein the memory is configured to store at least the UE paging identity IE.

10. The apparatus of claim 9, wherein the processor comprises a baseband processor to decode the first paging message and encode the second paging message.

11. A non-transitory computer-readable storage medium that stores instructions for execution by a processor of a base station configured for operation in a Third Generation Partnership Project (3GPP) access network, the instructions to configure processing circuitry to:
    decode a first paging message received at the base station from an access management function (AMF) entity to initiate paging of a User Equipment (UE),
    wherein the processor is configured to decode the first paging message to determine:
        a UE paging identity information element (IE) that identifies the UE; and
        a tracking area identifier (TAI) list that identifies tracking areas;
    wherein the processor is further configured to decode the first paging message to determine if a paging origin IE is included in the first paging message, the paging origin IE indicating whether the paging of the UE is originated due to a protocol data unit (PDU) session from a non-3GPP access network;

wherein in response to decoding the first paging message, the processor is configured to encode a second paging message to page the UE, the second paging message for transmission within a tracking area on the TAI list, wherein the second paging message is encoded to include:
the paging identity of the UE, and
an access type parameter if the paging of the UE originated due to a PDU session from a non-3GPP access network.

12. The non-transitory computer-readable storage medium of claim 11, wherein the base station is configured with logical nodes including a central unit (CU) and a distributed unit (DU).

13. The non-transitory computer-readable storage medium of claim 12, wherein the processor is configured to transfer control signalling from the CU to the DU for the second paging message.

14. The non-transitory computer-readable storage medium of claim 11, wherein the processor is further configured to decode the first paging message to determine if a paging discontinuous reception (DRX) IE is included in the first paging message.

15. The non-transitory computer-readable storage medium of claim 14, wherein the processor is configured to cause the base station to transmit the second paging message to the UE within a paging occasion based on information in the DRX IE if the paging DRX IE is included in the first paging message.

16. The non-transitory computer-readable storage medium of claim 11, wherein if the paging origin IE is included in the first paging message, and if the paging origin IE indicates that the paging of the UE is originated due to a PDU from a non-3GPP access network, the processor is configured to include the access type parameter in the second paging message to indicate to the UE that the paging originated from the non-3GPP access network.

17. The non-transitory computer-readable storage medium of claim 16, wherein the non-3GPP access network comprises a wireless local area network (WLAN).

18. An apparatus of a base station configured for operation in a Third Generation Partnership Project (3GPP) access network, the base station is configured with logical nodes including a central unit (CU) and a distributed unit (DU), the apparatus comprising:

memory; and a processor, configured to:
decode a first paging message received at the CU from an access management function (AMF) entity to initiate paging of a User Equipment (UE),
wherein the processor is configured to decode the first paging message to determine:
a UE paging identity information element (IE) that identifies the UE; and
a tracking area identifier (TAI) list that identifies tracking areas;
wherein the processor is further configured to decode the first paging message to determine if a paging origin IE is included in the first paging message, the paging origin IE indicating whether the paging of the UE is originated due to a protocol data unit (PDU) session from a non-3GPP access network;

wherein in response to decoding the first paging message, the processor is configured to encode a second paging message to page the UE, the second paging message encoded by the gNB-DU for transmission within a tracking area on the TAI list, wherein the second paging message encoded to include:
the paging identity of the UE, and
an access type parameter if the paging of the UE originated due to a PDU session from a non-3GPP access network.

* * * * *